(12) United States Patent
Hebbale et al.

(10) Patent No.: US 8,463,515 B2
(45) Date of Patent: Jun. 11, 2013

(54) REAL TIME ESTIMATION ALGORITHM FOR TORQUE CONVERTER CLUTCH FEED FORWARD PRESSURE FOR ECCC CONTROL

(75) Inventors: Kumaraswamy V. Hebbale, Troy, MI (US); Chi-Kuan Kao, Troy, MI (US); Chunhao J. Lee, Troy, MI (US); Xu Chen, Ann Arbor, MI (US); Jeremy V. Horgan, Livonia, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 288 days.

(21) Appl. No.: 12/850,199

(22) Filed: Aug. 4, 2010

(65) Prior Publication Data
US 2012/0035819 A1 Feb. 9, 2012

(51) Int. Cl.
*G06F 7/00* (2006.01)
*G06F 17/00* (2006.01)
*G06F 19/00* (2011.01)

(52) U.S. Cl.
USPC .................. 701/60; 701/1; 701/51; 475/125

(58) Field of Classification Search
USPC .................................. 701/51–68; 477/34–91
See application file for complete search history.

(56) References Cited

U.S. PATENT DOCUMENTS

| | | | | |
|---|---|---|---|---|
| 6,052,640 A * | 4/2000 | Wu | | 701/67 |
| 6,132,336 A * | 10/2000 | Adachi et al. | | 477/169 |
| 6,217,481 B1 * | 4/2001 | Watanabe et al. | | 477/169 |
| 6,565,483 B2 * | 5/2003 | Segawa et al. | | 477/174 |
| 6,928,357 B2 * | 8/2005 | Higashimata et al. | | 701/87 |
| 7,513,851 B2 * | 4/2009 | Sieffert et al. | | 477/176 |
| 7,643,929 B2 * | 1/2010 | Stroh | | 701/103 |
| 7,752,021 B2 * | 7/2010 | Holtz et al. | | 703/6 |
| 7,785,229 B2 * | 8/2010 | Maddock | | 477/62 |
| 7,846,065 B2 * | 12/2010 | Chen | | 477/168 |
| 7,854,683 B2 * | 12/2010 | DeGeorge et al. | | 477/176 |
| 7,979,186 B2 * | 7/2011 | Fayyad et al. | | 701/67 |
| 7,988,597 B2 * | 8/2011 | Lee et al. | | 477/176 |
| 8,100,802 B2 * | 1/2012 | Lee et al. | | 475/62 |
| 2009/0192017 A1 * | 7/2009 | Lee | | 477/169 |
| 2011/0060509 A1 * | 3/2011 | Otanez et al. | | 701/58 |
| 2011/0166757 A1 * | 7/2011 | Otanez et al. | | 701/60 |

OTHER PUBLICATIONS

Kotwicki, A.J., "Dynamic Models for Torque Converter Equipped Vehicles", SAE Paper 820393-1983, pp. 101-120, Warrendale, PA.

* cited by examiner

*Primary Examiner* — Khoi Tran
*Assistant Examiner* — Rachid Bendidi

(57) ABSTRACT

A powertrain includes a torque generative device and a torque converter having an impeller, a turbine and a torque converter clutch. A method to control torque converter slip includes monitoring a reference slip and a turbine speed of the torque converter, determining a turbine torque based upon the reference slip and the turbine speed, determining a feed forward torque converter clutch pressure command based upon the turbine torque, a torque generative device torque, and a TCC gain, and controlling the torque converter clutch based upon the feed forward torque converter clutch pressure command.

14 Claims, 5 Drawing Sheets

REAL TIME ESTIMATION ALGORITHM FOR TORQUE CONVERTER CLUTCH FEED FORWARD PRESSURE FOR ECCC CONTROL

TECHNICAL FIELD

This disclosure is related to a system and method for controlling the slip in a torque converter of a vehicle.

BACKGROUND

The statements in this section merely provide background information related to the present disclosure and may not constitute prior art.

Internal combustion engine vehicles that employ automatic transmissions may include a torque converter positioned between the engine and the transmission of the vehicle. A torque converter is a fluid coupling device typically including an impeller coupled to an output shaft of the engine and a turbine coupled to the input shaft of the transmission. The torque converter uses hydraulic fluid to transfer rotational energy from the impeller to the turbine.

The rotational speed of the impeller relative to the turbine in the torque converter is typically different so that there is a converter slip therebetween. Because large slips between the engine output and the transmission input significantly affect the fuel economy of the vehicle, some vehicles employ a torque converter clutch (TCC) for controlling or reducing the slip between the engine and the transmission. The TCC can also mechanically lock the impeller at the output of the engine to the turbine at the input of the transmission so that the engine and transmission rotate at the same speed. Locking the impeller to the turbine is generally only used in limited circumstances because of various implications.

Thus, a TCC generally has three modes. A fully locked mode, a fully released mode and a controlled slip mode. When the TCC is fully released, the slip between the impeller and the turbine of the torque converter is only controlled by the hydraulic fluid therebetween. In the slip mode, the slip between the torque converter impeller and turbine is set so that it does not exceed a predetermined amount by controlling the pressure of the hydraulic fluid in the TCC. Rapid changes in throttle request result in rapid changes to engine speed and torque applied to the torque converter. Rapid increases in engine speed and/or torque can result in torque converter clutch slip or TCC slip changing from a controlled value to an excessive value that is desirably controlled back to a controlled value.

When the TCC is operating in the slip mode, one method to control slip in the torque converter is known as Electronic Controlled Capacity Clutch (ECCC) control. ECCC control utilizes feed forward control of TCC torque to control torque converter slip to a desired value or range, for example, based upon fuel economy and noise, vibration and harshness (NVH) targets and the operation of the powertrain. Smaller slip values can improve fuel efficiency under certain conditions, while larger slip values can improve NVH and drivability issues under certain conditions.

SUMMARY

A powertrain includes a torque generative device and a torque converter having an impeller, a turbine and a torque converter clutch. A method to control torque converter slip includes monitoring a reference slip and a turbine speed of the torque converter, determining a turbine torque based upon the reference slip and the turbine speed, determining a feed forward torque converter clutch pressure command based upon the turbine torque, a torque generative device torque, and a TCC gain, and controlling the torque converter clutch based upon the feed forward torque converter clutch pressure command.

BRIEF DESCRIPTION OF THE DRAWINGS

One or more embodiments will now be described, by way of example, with reference to the accompanying drawings, in which.

DETAILED DESCRIPTION

Figure 1:
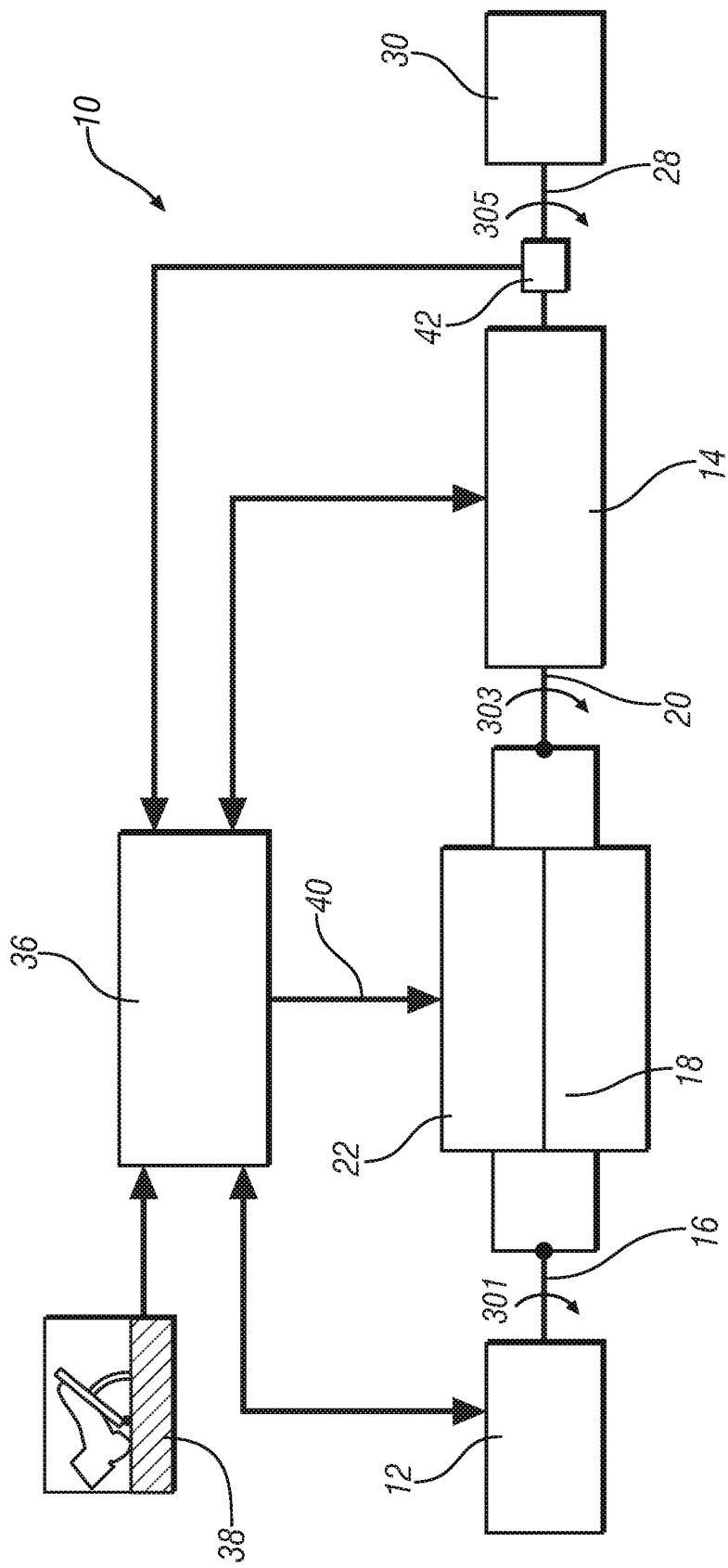
FIG. 1 is a block diagram showing various exemplary powertrain components of a vehicle, in accordance with the present disclosure.

Referring now to the drawings, wherein the showings are for the purpose of illustrating certain exemplary embodiments only and not for the purpose of limiting the same, FIG. 1 is a block diagram of various powertrain components of a vehicle 10. The powertrain components include an engine 12 and a transmission 14. An output shaft 16 of the engine 12 is coupled to the input (e.g. impeller) of a torque converter 18, and an input shaft 20 of the transmission 14 is coupled to the output (i.e. turbine) of the torque converter 18. The torque converter 18 transfers rotational energy from the engine 12 to the transmission 14 using hydraulic fluid so that the engine 12 can be mechanically disengaged from the transmission 14 when necessary. A TCC 22 applies a TCC torque for controlling a torque converter slip in the torque converter 18 between the engine 12 and the transmission 14. Engine output power is depicted as engine rotational speed $N_E$ measured in revolutions per minute (RPM) and engine torque $T_E$ 301 measured in Newton-meters. Likewise, transmission input power is depicted as transmission input speed $N_I$ (input speed) and transmission input torque $T_I$ 303. $T_I$ also describes the torque of the turbine of torque converter 18 or the turbine torque $T_T$. The torque slip in the torque converter 18 is defined as $N_E - N_I$. An output shaft 28 of the transmission 14 is coupled to a driveline 30 of the vehicle 10 that distributes the engine power to the vehicle wheels in a manner that is well understood to those having ordinary skill in the art. The speed of the output shaft 28 of the transmission 14 is represented as $N_O$ and the torque of the output shaft 28 of the transmission 14 is represented at $T_O$ 305.

The vehicle 10 also includes a controller 36 intended to represent both an engine controller and a transmission controller; however, it will be appreciated that these two controlling functions can be served by a single device or a plurality of communicatively connected devices. The controller 36 receives a throttle position signal from a vehicle throttle 38, and provides a signal to the engine 12 to provide the necessary engine speed and a signal to the transmission 14 to provide the necessary gear to satisfy the throttle demand. Additionally, the controller 36 provides a signal on line 40 to the TCC 22 to set the desired torque converter slip, for example, according to an ECCC control. According to one exemplary method, the desired torque converter slip is a function of a transmission gear state, an engine torque, and a turbine or input speed. Exemplary use of the input speed is used in this context as an indirect measure of output speed or vehicle speed. A sensor 42 measures the output behavior of the transmission 14. In one exemplary embodiment, the sensor 42 measures the rotational speed of the output shaft 28 of the transmission 14 and sends a speed signal to the controller 36. Suitable examples for the sensor include an encoder, speed sensor, accelerometer, torque sensor, etc.

The controller 36, as described above, can be a single device or a number of devices. Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. Controller 36 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Torque converter slip can be controlled by application of TCC torque. The TCC includes structures mechanically, electronically, or fluidically operated to controllably couple the impeller and turbine of the torque converter, modulating an allowed slip therebetween. When the TCC is fully released, the fluidic interaction between the impeller and the turbine control slip. The torque being transmitted through the torque converter is torque converter torque or turbine torque, transmitted in the fluidic interaction between the impeller and the turbine. TCC torque when the TCC is fully released substantially equals zero. When the TCC is fully locked, no slip between the impeller and turbine is possible, and the TCC torque equals the torque being transmitted through the torque converter. When the TCC is in a slip mode, the torque being transmitted through the torque converter includes some fraction of the torque as TCC torque, and the remainder of the torque being transmitted through the torque converter is turbine torque. In one exemplary control method, the pressure of hydraulic fluid to the TCC controls forces applied within the TCC and the resulting TCC torque so that the torque converter slip approaches a desired slip value or a reference slip. By reducing the pressure of the hydraulic fluid in the torque converter, torque converter slip for a given operating condition will increase. Similarly, by increasing the pressure of the hydraulic fluid in the torque converter, torque converter slip for a given operating condition will decrease.

Feedback control monitors a desired value, controls an output according to the desired value, and utilizes a resulting value of the controlled output to subsequently improve control to the desired value. Feedback control is known to control slip in a torque converter through variable control of a TCC. A desired torque converter slip can be monitored, a TCC pressure command can be modulated in order to control resulting torque converter slip, and the resulting torque converter slip can be used in a feedback loop to subsequently modulate the TCC pressure command. In this way, feedback TCC pressure can be utilized to control torque converter slip to a desired value. The desired value can be a steady state term, substantially unchanging through a time period, or the desired value can be transitory, for example, increasing or decreasing through a period or changing according to an exemplary step profile.

While torque converter slip can be controlled to some small value in steady state operation, rapid and significant increases in $N_E$ and $T_E$ consistent with rapidly increasing or tip-in throttle demands are known to result in rapid increases in torque converter slip. Excess slip reduces fuel efficiency of the powertrain and torque output to the output shaft and must be reduced in a timely method. Feedback control is inherently reactionary and includes a lag time in the control response. Further, feedback control of torque converter slip, described above, responding to a rapid change in torque converter slip, can result in unpredictable changes to the torque converter slip, for example, feedback induced increases in TCC pressure commands resulting in the slip quickly being reduced to zero. Rapidly changing slip resulting in zero slip can result in perceptible and undesirable effects to drivability.

Feed forward control methods are known to predict operation of a system through transient operation and generate control commands based upon the predicted operation of the system. Feed forward control can be utilized in combination with feedback control to improve the accuracy of control and counter the effects of the feedback lag.

Feed forward control methods, in combination with feedback control, can be applied to control of a TCC. Such an exemplary system can include a pressure control term described by the following equation.

$$TCC\,pressure\,command = feedback\_term + feed\_forward\_term \quad [1]$$

In this way, the TCC can be controlled based upon a feedback TCC pressure command and a feed forward TCC pressure command.

Methods to affect control of a feed forward portion of TCC control can be based upon different inputs. For example, feed forward control of the TCC can be based upon engine torque, $T_E$. In one exemplary embodiment, feed forward control can be made to be proportional to $T_E$. An increase or decrease in $T_E$ creates a proportional corresponding increase or decrease in commanded TCC torque. In another embodiment, feed forward TCC control can be calibrated according to $T_E$ and corresponding behavior in the torque converter. In such an embodiment, a look-up table, a programmed functional relationship, or a model based upon the calibration can be utilized to determine a feed forward portion of TCC control for a monitored $T_E$ input.

Torque converter slip affects operation and drivability of the vehicle. Too much slip in steady state reduces fuel efficiency; too little slip in steady state results in reduced drivability. Too much or too little slip in transient conditions can cause a runaway slip condition, resulting in a loss of power to the output, or a locked up clutch or clutch "crashed" condition. However, a desired slip in a transition may not equal a desired slip in steady state conditions. For example, during a commanded acceleration, slip can be increased to a controlled level, allowing the engine to quickly accelerate, and then subsequently controlling slip again to a lower number to rapidly increase output torque through the transmission. In such an embodiment, it may be desirable to disable feedback control of the slip during the controlled increase of slip to avoid undesirable operation of the torque converter. Setting such a desired slip value for feed forward TCC control can be described as selecting a reference slip.

A reference or desired torque converter clutch slip, for example, as determinable through the ECCC method described above, can be used to determine the feed forward pressure command. Such a reference slip can be determined or calibrated for a particular engine configuration based upon fuel efficiency and NVH performance and priorities. A method for determining a feed forward control of a TCC includes monitoring a reference slip, an input speed, and an engine torque; determining a turbine torque based upon the reference slip and the input speed; and determining the feed forward control of the TCC based upon the turbine torque, the engine torque, and a TCC gain. Determining the turbine torque based upon the reference slip and the input speed can take a number of exemplary embodiments. For example, a Kotwicki method known in the art can be utilized to determine turbine torque based upon the reference slip and the input speed. Another example includes utilizing a K-factor look-up table to determine turbine torque based upon the reference slip and the input speed. These two non-limiting examples are explained in greater detail herein.

A method can be described utilizing a Kotwicki model to estimate a turbine torque and determining a feed forward pressure based upon the turbine torque. Teachings of the Kotwicki model can be found in SAE paper No 820393 1983. A multi-region Kotwicki model, providing $T_T$ is illustrated by the following equation:

$$T_T = \alpha_1(i)\omega_{pump}^2 + \alpha_2(i)\omega_{pump}\omega_{turbine} + \alpha_3(i)\omega_{turbine}^2 \quad [2]$$

The term $\omega_{pump}$ of the Kotwicki model can be expressed as the speed of the torque generative device of the powertrain, for example an engine speed $N_E$ or, in the event of an electrically driven or hybrid driven powertrain utilizing a torque converter, a motor speed. The term $\omega_{turbine}$ of the Kotwicki model can be expressed as the speed of the turbine in the torque converter or the input speed, $N_I$, of the transmission input shaft attached to the turbine. The terms $\alpha_1(i)$, $\alpha_2(i)$, and $\alpha_3(i)$ are Kotwicki coefficients. According to one exemplary embodiment, the Kotwicki coefficients are determined by a regression fit of experimental data for a particular torque converter. The Kotwicki model includes different equations for different regions of operation. The regions in which the Kotwicki model can operate can be described according to a number of embodiments. In one embodiment, regions or modes can be described. A converter mode in drive is defined; a coupling mode in drive is defined; and a coast mode in coast is defined.

Such regions or modes defining Kotwicki model operation can be selected based upon functional relationships, for example, inputting $N_I$ and $N_E$, with the functional relationships being defined by desired torque converter operation according to methods known in the art. According to one embodiment, the experimental test data available for torque converters is in a dimensionless format, which have to be converted to speeds and torques before regression analysis. In one exemplary embodiment, four dimensionless ratios can be used to represent torque converter data. A first ratio is a slip ratio is determined from $\omega_{pump}$ and $\omega_{turbine}$, as expressed by the following equation.

$$\text{Slip\_Ratio} = \omega_{turbine}/\omega_{pump} \quad [3]$$

It will be appreciated that slip ratio can alternatively be expressed in terms of $N_I$ divided by $N_E$. A second ratio is a torque ratio, determined from pump torque (or engine or motor torque), $T_P$, and turbine torque, $T_T$, as expressed by the following equation.

$$\text{Torque\_Ratio} = T_T/T_P \quad [4]$$

It will be appreciated that torque ratio can alternatively be expressed in terms of $T_I$ divided by $T_E$. A third ratio is a K-factor, as expressed by the following equation.

$$K\_factor = \omega_{pump}/\sqrt{T_P} \quad [5]$$

It will be appreciated that K-factor can alternatively be expressed in terms of $N_E$ and $T_E$. A fourth ratio is an efficiency percentage, which can be expressed by the following equation.

$$\text{Efficiency\_\%} = \frac{\omega_{turbine} T_T}{\omega_{pump} T_P} * 100\% \quad [6]$$

It will be appreciated that efficiency percentage can alternatively be expressed in terms of $N_I$, $T_I$, $N_E$, and $T_E$. When converter data is processed in terms of these ratios, the torque ratio, K-factor, and efficiency are all single valued functions of speed ratio. In other words, a given torque converter, at a given speed ratio, produces one and only one value of torque ratio, K-factor, and efficiency without regard to the absolute levels of torque and speed.

An exemplary data set for a torque converter contains torque ratio and K-factor values at different speed ratios, the speed ratios ranging from 0 (representing a stall ratio) to 1.0. The torque ratio is maximum at stall, usually between 1.5 and 2.5. The torque ratio decreases monotonically as speed ratio increases, and at approximately 0.9 speed ratio becomes exactly 1.0. This is known as the coupling point. When the speed ratio is above 0.9 or the coupling point, the torque ratio remains constant at 1.0. The K-factor is nearly constant from the stall ratio to about 0.6 speed ratio and then begins to increase rapidly. The operation of the torque converter from stall to coupling point is known as a converter mode. Beyond the coupling point operation is called a coupling mode. Because the torque ratio remains constant in the coupling mode, indicating $T_T$ equal to $T_P$, the Kotwicki coefficients in the coupling mode are different from the coefficients in the converter mode.

According to one embodiment, the relationship described in Equation 2 can be modified to describe each of the regions. In the converter mode in drive, pump torque (or engine or motor torque), $T_P$, and turbine torque, $T_T$, can be expressed as follows.

$$T_P = a_1 \omega_{pump}^2 + a_2 \omega_{pump} \omega_{turbine} + a_3 \omega_{turbine}^2 \quad [4]$$

$$T_T = b_1 \omega_{pump}^2 + b_2 \omega_{pump} \omega_{turbine} + b_3 \omega_{turbine}^2 \quad [5]$$

In the coupling mode, the torques can be expressed as follows.

$$T_P = T_T = c_1 \omega_{pump}^2 + c_2 \omega_{pump} \omega_{turbine} + c_3 \omega_{turbine}^2 \quad [6]$$

In the coast mode, the torques can be expressed as follows.

$$T_P = T_T = d_1 \omega_{pump}^2 + d_2 \omega_{pump} \omega_{turbine} + d_3 \omega_{turbine}^2 \quad [7]$$

In this way, coefficients for the different regions of the Kotwicki model can be determined and utilized to determine $T_T$ in each of the regions.

Figure 2:
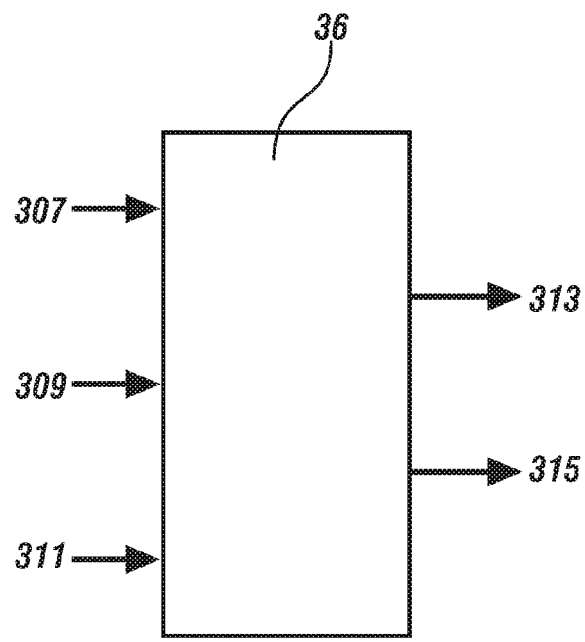
FIG. 2 schematically depicts and exemplary module to determine a feed forward pressure command, in accordance with the present disclosure.

FIG. 2 schematically depicts and exemplary module to determine a feed forward pressure command, in accordance with the present disclosure. Module 100 is depicted. Inputs to module 100 include a reference torque converter slip 307, an input speed, $N_I$, 309 and an engine torque, $T_E$, 311. As described above, the reference slip is a desired slip level. The term $N_I$ is measured input speed. The term $T_E$ is estimated engine torque. Based upon these inputs, module 100 outputs a turbine torque 313 and a feed forward pressure command for the TCC 315. It will be appreciated that module 100, the inputs to module 100, and the outputs to module 100 can take a number of different embodiments and remain consistent with the methods described herein.

Figure 3:
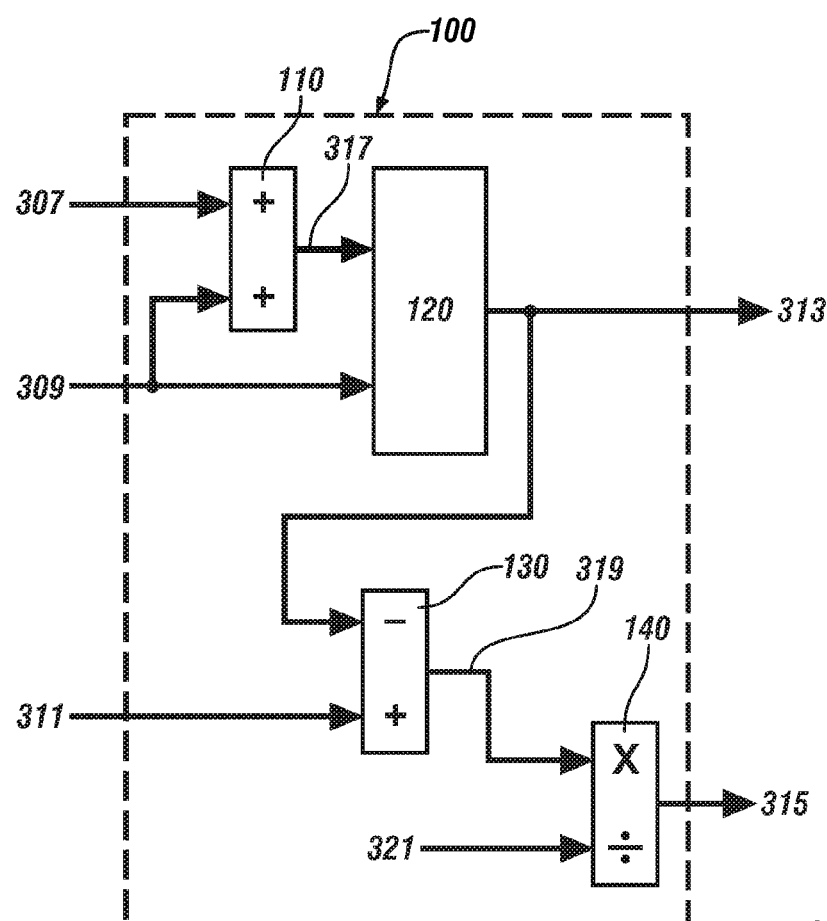
FIG. 3 schematically depicts an exemplary module to determine a feed forward pressure command in greater detail, in accordance with the present disclosure.

FIG. 3 schematically depicts an exemplary module to determine a feed forward pressure command in greater detail, utilizing an exemplary Kotwicki model, in accordance with the present disclosure. One exemplary embodiment of module 100 described in FIG. 2 is depicted in FIG. 3. Module 100 includes a summing block 110, a Kotwicki model module 120, a summing block 130, and gain factor block 140. Inputs to module 100 include reference slip 307, $N_I$ 309, and $T_E$ 311. Summing block 110 adds the reference slip 307 and $N_I$ 309 in order to determine a desired or reference engine speed 317. Kotwicki model module 120 inputs the reference engine speed 317 and $N_I$ 309 and outputs turbine torque 313, in accordance with the methods described herein. Summing module 130 inputs turbine torque 313 and $T_E$ 311, determines a difference, and outputs TCC torque 319. Gain factor block 140 inputs the TCC torque 319, applies a TCC gain 321, and outputs the feed forward pressure command 315. The TCC gain 321 can be determined by calibration, modeling, or any method sufficient to describe a relationship between TCC torque and TCC pressure and can include different values for different conditions and operating ranges.

Figure 4:
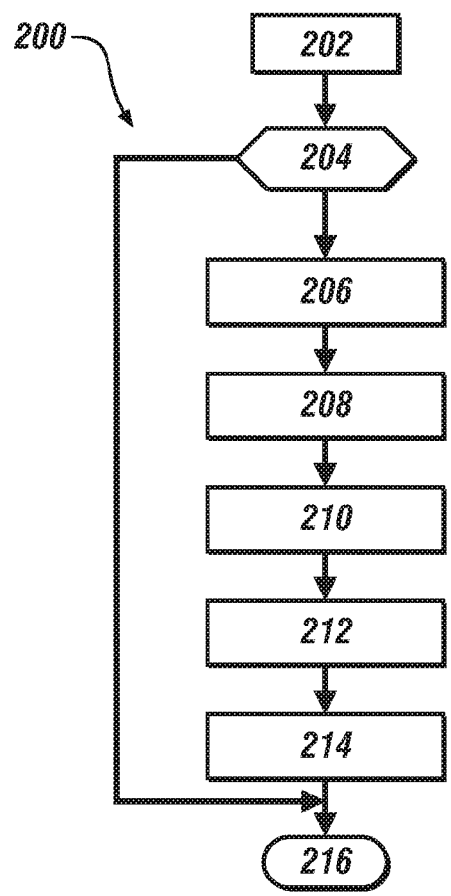
FIG. 4 depicts a flowchart describing an exemplary process employing a Kotwicki model, in accordance with the present disclosure.

FIG. 4 depicts a flowchart describing an exemplary process employing a Kotwicki model, in accordance with the present disclosure. Process 200 describes use of an exemplary Kotwicki model in accordance with ECCC, however it will be appreciated that the methods described herein can be employed in other schemes to control application of the TCC. It will be appreciated that process 200 can be employed iteratively, for example, at a regular frequency. In another example, the process could be employed based upon some event or request from another control module. Process 200 starts at step 202. At step 204, a determination is made whether the ECCC is in an on state. If the ECCC is on, then the process advances to step 206. If ECCC is not on, then the system advances to step 216, and the process ends or returns for another iteration. At step 206, the process monitors a turbine speed, a reference slip and an engine torque. At step 208, the process determines a desired engine speed based upon summing the turbine speed and the reference slip. In step 210, the process determines the turbine torque according to methods described herein. In step 212, the TCC torque or the portion of torque transmitted through the torque converter carried by the TCC is determined by subtracting the turbine torque from an engine torque. In step 214, feed forward pressure command to the TCC is determined by dividing the TCC torque by a TCC gain. At step 216, the process ends or returns for another iteration.

Figure 5:
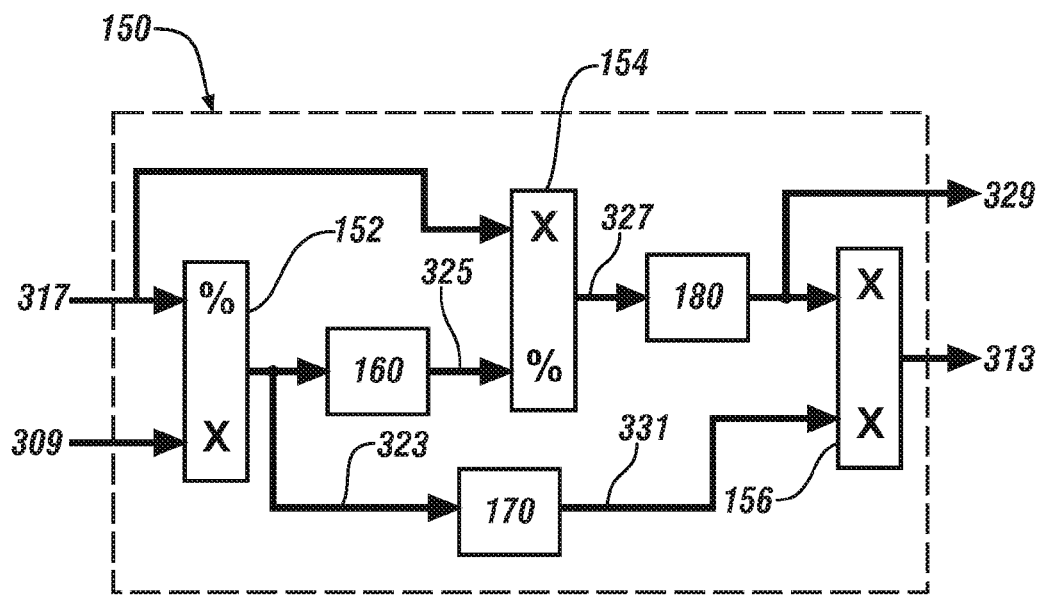
FIG. 5 depicts exemplary operation of a powertrain including depiction of a determined feed forward pressure command based upon the depicted operation, in accordance with the present disclosure.

As an alternative exemplary method to determine turbine torque, a look-up table utilizing a determinable relationship based upon a slip ratio can be utilized to determine turbine torque. FIG. 5 schematically depicts an exemplary module to determine a turbine torque utilizing a K-factor look-up table, in accordance with the present disclosure. Reference engine speed 317 and $N_I$ 309 are inputs to module 150. Multiplication division module 152 divides $N_I$ 309 by reference engine speed 317 to generate slip ratio 323. K-factor look-up module 160 receives slip ratio 323 and looks up a determinable K-factor output 325 based upon tabulated values. Multiplication division module 154 divides the reference engine speed 317 by the K-factor output 325 to determine signal 327. Signal 327 is an input to squaring module 180, which outputs an estimated engine torque signal 329. Torque ratio module 170 inputs slip ratio 323, applies a functional relationship between slip ratio and torque ratio, and outputs torque ratio 331. Multiplication module 156 inputs estimated engine torque signal 329 and the torque ratio 331 and outputs turbine torque 313. In this way, a K-factor look-up table can be utilized to generate a turbine torque. Further, module 150 can be utilized in place of module 120 in the exemplary module of FIG. 3 to determine a feed forward pressure command. Further, the process employed in FIG. 4 can interchangeably utilize a K-factor look-up table as embodied in FIG. 5 in place of the Kotwicki model described in relation to FIG. 4.

Figure 6:
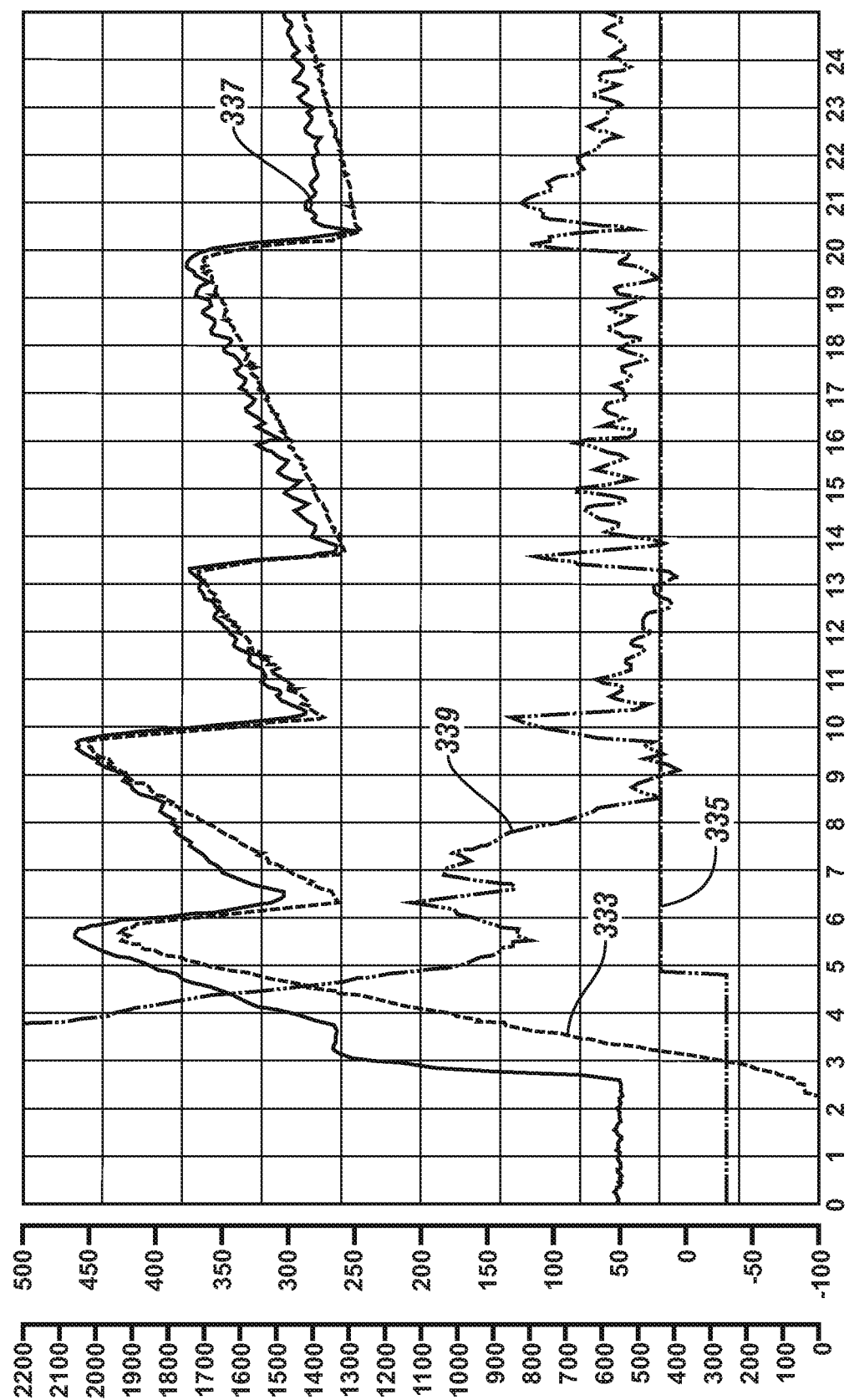
FIG. 6 depicts exemplary operation of a powertrain including a tip in event and operation of a desired slip level in response to the tip in event and including depiction of a determined feed forward pressure command based upon the depicted operation, in accordance with the present disclosure.

FIG. 6 depicts exemplary operation of a powertrain including depiction of a determined feed forward pressure command based upon the depicted operation, in accordance with the present disclosure. The x-axis describes time in seconds, and a leftmost y-axis describes engine and input speed in RPM and a second y-axis describes slip in RPM. FIG. 6 depicts operation of a powertrain through the depicted time period, including a measured engine speed 337, a measured turbine or input speed 333, and a determined torque converter slip 339 based upon the engine speed and the input speed. Further, FIG. 6 depicts a reference slip 335 utilized to control a feed forward pressure command to the TCC in accordance with the methods described herein, without feedback control of the TCC. As a result of operation of the engine through the depicted time period, a pattern is described consistent with an acceleration of the powertrain through a series of gear states. Examination of the data of FIG. 6 reveals that slip is controlled according to the reference slip until the next gear state shift occurs, and then increased slip associated with the gear state shift is again controllably reduced to the reference slip.

The data of FIG. 6 depicts an exemplary system operating in the absence of a feedback TCC pressure command. It will be appreciated that systems can still operate according to Equation 1, utilizing both feed forward and feedback pressure commands. However, a benefit of the methods described herein includes reduced dependence upon feedback control of the TCC pressure command, wherein feedback control is based upon a difference between measured TCC performance and desired TCC performance, based upon accurate determination of the feed forward TCC pressure command and resulting reduced difference between the measured TCC performance and desired TCC performance.

Figure 7:
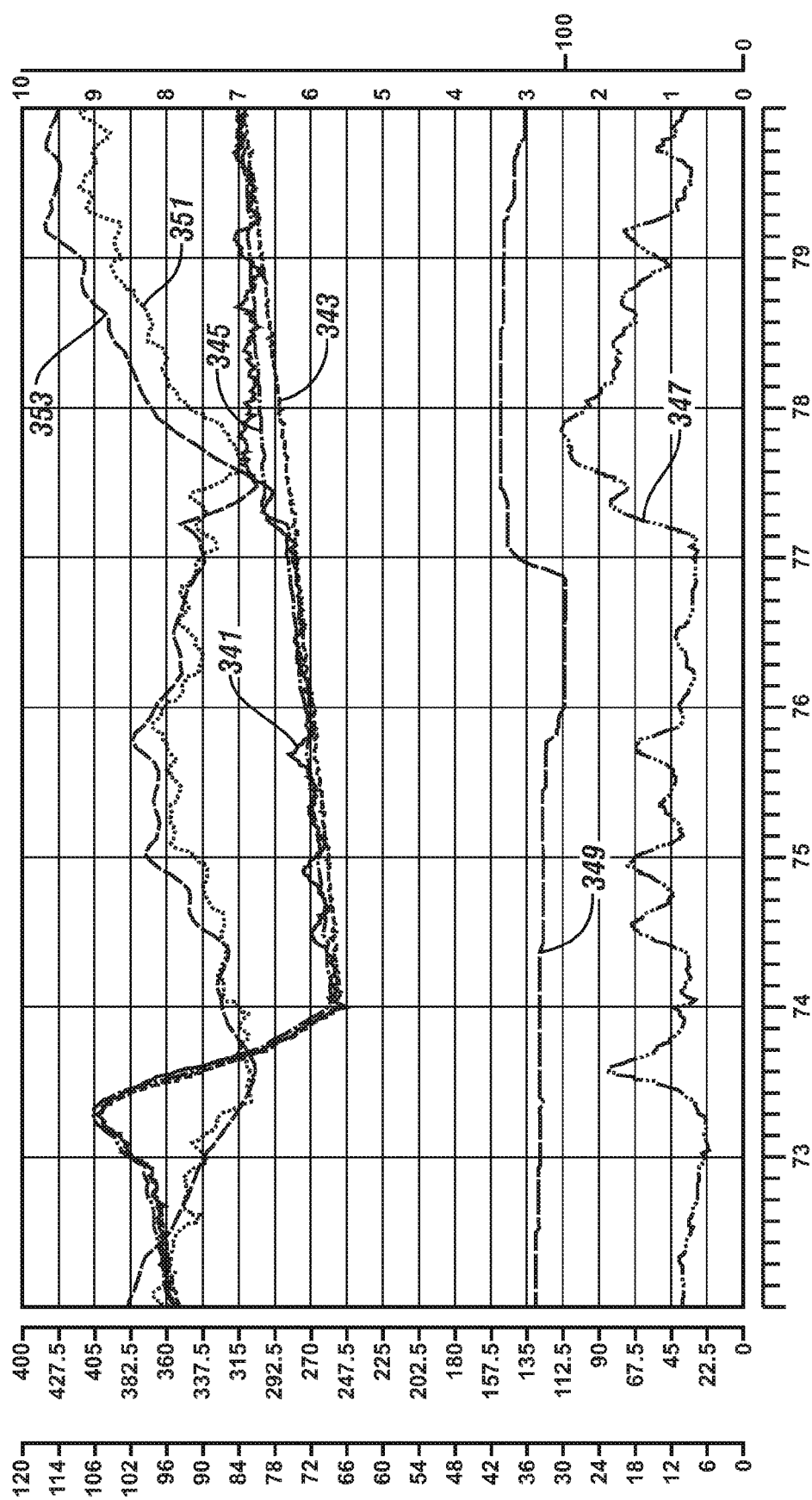
FIG. 7 depicts exemplary operation of a powertrain including a tip in event and operation of a desired slip level in response to the tip in event and including depiction of a determined feed forward pressure command based upon the depicted operation, in accordance with the present disclosure.

FIG. 7 depicts exemplary operation of a powertrain including a tip in event and operation of a desired slip level in response to the tip in event and including depiction of a determined feed forward pressure command based upon the depicted operation, in accordance with the present disclosure.

FIG. 7 depicts operation of a powertrain through the depicted time period, including a reference or feed forward engine speed 345 and a corresponding measured engine speed 341, a measured turbine or input speed 343, and a determined torque converter slip 347 based upon the engine speed and the input speed. The x-axis describes time in seconds. A leftmost y-axis describes pedal position as a percent. A center y-axis describes a TCC pressure in kPa. A rightmost y-axis depicts a TCC slip in RPM. FIG. 7 depicts an accelerator pedal position 349. The exemplary system of FIG. 7 utilized a reference slip of 100 RPM through the tip in event, an increase from typical reference TCC slip values in steady state operation. Resulting feed forward pressure commands determined according to the methods describe herein are depicted by plot 353, as well as measured TCC pressure values in plot 351. Such a desired increase in slip during a tip in event permits the engine speed to rapidly increase during the tip in event. A rapid increase in engine speed permits the engine output to rapidly increase and additionally provides a tangible response of the engine to the input of the operator of the powertrain. However, rapid changes in torque combined with rapid changes to TCC slip can result in run-away TCC slip. FIG. 7 depicts an exemplary system utilizing a reference slip and the methods described herein to apply a feed forward TCC pressure command to prevent runaway slip in excess of the reference slip. At approximately 77 seconds in the depicted time period, a rapid increase in accelerator pedal position is depicted. In response, an increase to both the reference engine speed and the measured engine speed occurs. Such an increase in slip can be monitored and permitted to a desired slip level. FIG. 7 depicts a system operating in accordance with the reference slip level in response to a tip in event. FIG. 7 depicts a feed forward pressure command to the TCC, determined according to the methods described herein, and corresponding measured pressure to the TCC. As described above, upon detection of the tip in event, a reference TCC slip is increased to 100 RPM. Additionally, at approximately 77.2 seconds, the feed forward pressure command 353 is substantially decreased, facilitating an increase in TCC slip 347. Such a decrease can be a calibrated incremental drop in pressure command, a percentage drop in pressure command, or a drop determined by a predetermined functional determination. In response to the increase in engine speed and the decrease in pressure to the TCC, slip quickly increases to the exemplary desired slip level of 100 RPM. As is evident in the depicted data, application of the feed forward TCC pressure command accomplishes controlling the TCC slip through the tip-in event according to the reference slip.

The above methods describe engine speed and/or engine torque as an input to the various modules or methods. It will be appreciated in hybrid drive or electric drive applications wherein a torque converter and associated torque converter clutch is utilized, the engine terms including engine speed and engine torque can be substituted with appropriate motor terms or torque generative device terms.

The above method describes how a feed forward pressure command can be developed for use with ECCC. In a transition, when the ECCC is initially turned on, the feed forward pressure command may need to be ramped up to the value determined by the described method to avoid an abrupt change to the pressure command. Similarly, during gear shifts, the feed forward component can be frozen to avoid unnecessary transients. During throttle tip-ins and when the ECCC command is on, the feedback portion of the pressure command can be turned off and the feed forward pressure command can be solely used to minimize slip excursions. During throttle tip-ins and when the ECCC command is off, the feed forward pressure command is set to zero until the ECCC command is turned on, after which the feed forward pressure command can be ramped to the target value.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control torque converter slip in a powertrain comprising a torque generative device and a torque converter comprising an impeller, a turbine and a torque converter clutch, the method comprising:
   during a transition of a speed of the torque generative device, monitoring a desired slip for the transition;
   monitoring a turbine speed of the torque converter;
   determining a turbine torque based upon the desired slip and the turbine speed;
   determining a feed forward torque converter clutch pressure command based upon the turbine torque, a torque generative device torque, and a torque converter clutch gain; and
   controlling the torque converter clutch based upon the feed forward torque converter clutch pressure command.

2. The method of claim 1, wherein determining the turbine torque based upon the desired slip and the turbine speed comprises utilizing a turbine torque determination selected from the group consisting of a Kotwicki model and a K-factor look-up table.

3. Method to control torque converter slip in a powertrain comprising a torque generative device and a torque converter comprising an impeller, a turbine and a torque converter clutch, the method comprising:
   during a transition of a speed of the torque generative device, monitoring operation of the powertrain, comprising;
      monitoring a desired slip for the transition;
      monitoring a transmission input speed; and
      monitoring an engine torque;
   utilizing a Kotwicki model to estimate a turbine torque based upon the monitored operation of the powertrain;
   determining a feed forward torque converter clutch pressure command based upon the turbine torque; and
   controlling the torque converter clutch based upon the feed forward torque converter clutch pressure command.

4. The method of claim 3, wherein monitoring operation of the powertrain further comprises:
   determining a desired engine speed based upon the reference slip and the transmission input speed.

5. The method of claim 3, wherein determining the feed forward torque converter clutch pressure based upon the turbine torque comprises:
   determining a torque converter clutch torque based upon the turbine torque and the engine torque; and
   determining the feed forward torque converter clutch pressure based upon the torque converter clutch torque and a torque converter clutch gain.

6. The method of claim 3, wherein controlling the torque converter clutch is further based upon a feedback torque converter clutch pressure command.

7. The method of claim 6, wherein the feedback torque converter clutch pressure command is disabled during rapid transients to the powertrain.

8. The method of claim 3, wherein determining the feed forward torque converter clutch pressure command comprises:
monitoring a tip in event of the powertrain; and
modulating the feed forward torque converter clutch pressure command based upon a desired slip level based upon the tip in event.

9. The method of claim 3, wherein monitoring operation of the powertrain comprises:
monitoring an engine speed; and
monitoring a transmission input speed;
wherein utilizing the Kotwicki model to estimate a turbine torque comprises:
determining a region of the Kotwicki model based upon the engine speed and the transmission input speed; and
utilizing the Kotwicki model based upon the determined region.

10. The method of claim 9, wherein determining the region of the Kotwicki model comprises selecting between a converter mode in drive, a coupling mode in drive, and a coast mode in coast.

11. System to control torque converter slip in a powertrain comprising a torque generative device and a torque converter comprising an impeller, a turbine and a torque converter clutch, the system comprising:
said torque converter clutch; and
a control module:
during a transition of a speed of the torque generative device, monitoring a desired slip of the torque converter for the transition;
monitoring a transmission input speed;
determining a torque converter torque based upon the reference slip and the transmission input speed;
monitoring an engine torque;
determining a torque converter clutch torque based upon the torque converter torque and the engine torque;
determining a feed forward torque converter clutch pressure based upon the torque converter clutch torque and a torque converter clutch gain; and
utilizing the feed forward torque converter clutch pressure to control the torque converter clutch.

12. The system of claim 11, wherein the control module determining the torque converter torque comprises utilizing a Kotwicki model.

13. The system of claim 11, wherein the control module determining the torque converter torque comprises utilizing a K-factor look-up table.

14. The system of claim 11, wherein the torque generative device comprises an engine.

\* \* \* \* \*